United States Patent
Sugiyama (10) Patent No.: US 7,039,492 B2
(45) Date of Patent: May 2, 2006

(54) NUMERICAL CONTROL APPARATUS FOR MACHINE TOOL AND NUMERICAL CONTROL METHOD FOR MACHINE TOOL

(75) Inventor: Tetsuya Sugiyama, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 147 days.

(21) Appl. No.: 10/849,726

(22) Filed: May 20, 2004

(65) Prior Publication Data

US 2005/0159836 A1 Jul. 21, 2005

(30) Foreign Application Priority Data

May 22, 2003 (JP) .......................... P2003-144914

(51) Int. Cl.
*G06F 19/00* (2006.01)

(52) U.S. Cl. .......................... 700/181; 700/86; 700/87; 700/88; 700/89; 700/180; 700/194; 700/251

(58) Field of Classification Search .................. 700/83, 700/86, 87, 88, 89, 159–160, 180, 181, 250, 700/251, 253, 169, 179, 195, 194
See application file for complete search history.

(56) References Cited

U.S. PATENT DOCUMENTS 4,628,444 A * 12/1986 Nozawa et al. ............... 700/83
5,229,950 A * 7/1993 Niwa .......................... 700/181
5,291,416 A * 3/1994 Hutchins ..................... 700/174
6,317,646 B1 * 11/2001 de Caussin et al. .......... 700/173
2005/0113958 A1* 5/2005 Shimizu et al. ............. 700/181
2005/0149224 A1* 7/2005 Sakagami et al. ........... 700/188

FOREIGN PATENT DOCUMENTS

EP 001489473 A2 * 12/2004
JP P2001-170843 A 6/2001

* cited by examiner

Primary Examiner—Ramesh Patel
(74) Attorney, Agent, or Firm—Osha Liang LLP (57) ABSTRACT

A numerical control apparatus for machine tool, includes: an NC program storage portion for storing an NC program; a block skip command detection portion for detecting whether a block skip command for skipping execution of blocks after a position where the block skip command is described is present in the NC program stored in the NC program storage portion or not; a block skip end command detection portion for detecting whether a block skip end command provided in connection with the block skip command to permit execution of blocks after a position where the block skip end command is described is present in the NC program or not; and a coordinate comparison portion for performing comparison concerning a difference between coordinates on at least one control axis in the block skip command and the block skip end command.

12 Claims, 7 Drawing Sheets

| CH1 | CH3 | CH2 |
|---|---|---|
| TOP: | TOP | TOP |
| G0Z0.0 | | G95 |
| | | T2000 |
| waitm (1,1,2,3) | waitm (1,1,2,3) | waitm (1,1,2,3) |
| M20 | M20 | M20 |
| G0X10.0Z10.0 | G28Z0.0 | M75 |
| G28X60.0 | | |
| | | N1 |
| | | ;msg ("DRILL") |
| | | T3800 |
| | | wcs132 |
| | | MS2 |
| | | M3 S2000 |
| | | |
| | | EM75: |
| | waitm (2,2,3) | waitm (2,2,3) |
| | G28X60.0 | M75 |
| | | |
| | | G0 Z-1 |
| | | G1 Z3. F.05 |
| | | G28 Z0 |
| | | |
| | | EM75: |
| | | M900 |
| waitm (49,1,2,3) | waitm (49,1,2,3) | waitm (49,1,2,3) |
| M99 | M99 | T2000 |
| M30 | M30 | M99 |
| | | M30 |

NUMERICAL CONTROL APPARATUS FOR MACHINE TOOL AND NUMERICAL CONTROL METHOD FOR MACHINE TOOL

BACKGROUND OF THE INVENTION

1. Field of the Invention

The present invention relates to a numerical control apparatus for machine tool and a numerical control method for machine tool. Particularly it relates to a numerical control apparatus and method in which efficiency in transformation of an NC program into an electronic cam program can be improved to thereby attain improvement in machining efficiency.

2. Background Art

There is commonly known a numerical control machine tool used for machining a material into a desired shape by using a tool such as a cutter in the condition that the material is set in the machine tool. For example, the numerical control machine tool operates as follows. A numerical control program (NC program) is generated. Respective portions inclusive of the tool such as a cutter are operated automatically by the NC program to thereby obtain a product processed into a desired shape.

The NC program per se generated for obtaining such a machined product can be generally generated and corrected on the numerical control machine tool. When, for example, nonconformity that the machined product does not satisfy tolerance on design is detected as a result of trial cutting of the machined product, the NC program can be corrected on the machine tool side to eliminate the nonconformity. As result, high working efficiency can be provided.

On the other hand, use of an electronic cam program instead of the NC program is known. A material set in a machine tool is machined into a desired shape by use of a tool such as a cutter under control using the electronic cam program. For example, control using the electronic cam program has been disclosed in JP-A-2001-170843.

That is, as disclosed in JP-A-2001-170843, command data of a moving axis at every moment is generated on the basis of rotation position data generated at every moment by a pulse signal output from a pulse encoder mounted on a reference axis and command position data of the moving axis set in accordance with unit rotation position of the reference axis. Command velocity data of the moving axis in synchronism with the rotational velocity of a rotary object is generated on the basis of the moving command data and the rotation position data. The position of a tool is controlled on the basis of the moving command data and the command velocity data generated as described above. In the numerical control machine tool using this type electronic cam program, respective position data of a tool and a workpiece with respect to an accumulated rotation angle of a main shaft are decided. There is an advantage that machining can be made accurately in a short time compared with the numerical control machine tool using the NC program.

Generally, graphic information, designated machining paths, machining steps, tool information, tooling information, etc. are input to a CAM software or the like installed in a personal computer or the like provided separately from the numerical control machine tool to thereby generate this type electronic cam program. It is conceived that a certain kind of transformer software is used for transforming an NC program into an electronic cam program.

According to the background-art configuration, the following problem occurs.

When a machine tool is to be operated by an electronic cam program, the electronic cam program for operating the machine tool needs to be generated as a fixed program in advance and must have reasonable continuous data.

When, for example, block skip is to be executed in the case where the machine tool is operated by an NC program, the block skip can be executed without any trouble because data to be moved from the coordinate value of a block skip source to the coordinate value of a block skip destination can be generated during the execution even in the case where the coordinate value of the block skip source is different from the coordinate value of the block skip destination.

On the other hand, when the machine tool is to be operated under electronic cam program control, it is difficult to change data in accordance with whether block skip is executed or not, because the electronic cam program for operating the machine tool is a fixed program. Moreover, if block skip is executed, there is a high possibility that continues data cannot be obtained. Generally, in the case of electronic cam control, a servomotor is driven to move a tool directly to a command position generated at every synchronous timing. Accordingly, the moving distance between two points of timing is limited as a matter of course. Accordingly, when continuous data as described above are not obtained, there is fear that position control cannot be made.

On the other hand, an electronic cam program may be generated in advance so that the coordinate value of a block skip destination coincides with the coordinate value of a block skip source to thereby obtain reasonable continuous data regardless of block skip. In this case, the locus of the NC program before transformation is however changed, so that the possibility of interference of the machine tool increases undesirably. In addition, there is an undesirable possibility that the machine tool cannot operate in accordance with the locus intended by the user. Of course, if the configuration of the machine tool is selected suitably, no fear of interference may be obtained though the locus is changed. In this case, the aforementioned method can be used.

For the aforementioned reason, in the background art, when the coordinate value of the block skip source is different from the coordinate value of the block skip destination, the generation of the electronic cam program is stopped while a message indicating that the NC program cannot be transformed into an electronic cam program is displayed. Accordingly, there are a lot of NC programs that cannot be transformed into electronic cam programs. As a result, there is a problem that an effect of improving machining efficiency cannot be obtained sufficiently.

SUMMARY OF THE INVENTION

Under such circumstances, an object of the invention is to provide a numerical control apparatus for machine tool and a numerical control method for machine tool, in which, when an NC program is transformed into an electronic cam program, a phenomenon for making transformation impossible because of the presence of block skip can be eliminated as much as possible to thereby improve efficiency in transformation of the NC program into the electronic cam program and accordingly improve machining efficiency.

(1) To achieve the foregoing object, the invention provides a numerical control apparatus for machine tool, comprising: an NC program storage portion for storing an NC program generated for machining a material into a desired shape; a block skip command detection means for detecting whether a block skip command for skipping execution of blocks after a position where the block skip command is described is present in the NC program stored in the NC program storage portion or not; a block skip end command detection means for detecting whether a block skip end command provided in connection with the block skip command to permit execution of blocks after a position where the block skip end command is described is present in the NC program stored in the NC program storage portion or not; and a coordinate comparison means for performing comparison concerning a difference between coordinates on at least one control axis in the block skip command and the block skip end command.

(2) The invention also provides a numerical control apparatus for machine tool according to the paragraph (1), wherein the coordinate comparison means performs comparison concerning a difference between coordinates on the basis of selected tool numbers.

(3) The invention further provides a numerical control apparatus for machine tool according to the paragraph (1), further comprising a block skip erasing means for performing a process of erasing erasable block skip end commands and erasable block skip commands at the time of transformation of the NC program into the electronic cam program when a plurality of block skip command-block skip end command combinations are present in the NC program.

(4) The invention further provides a numerical control apparatus for machine tool according to the paragraph (1), further comprising: a transformation judgment means for searching for "good" coordinates after the block skip end command when "no good" is decided as a result of comparison by the coordinate comparison means, and performing a judgment, when identical coordinates are detected, as to whether the NC program written in blocks between a block of the detected coordinates and the block skip end command can be transformed into an electronic cam program or not; and a moving means for moving the block skip end command to the rear of a line on which the coordinates are detected when "good" is obtained as a result of the judgment by the transformation judgment means.

(5) The invention further provides a numerical control apparatus for machine tool according to the paragraph (1), further comprising: a transformation judgment means for searching for "good" coordinates after the block skip end command when "no good" is decided as a result of comparison by the coordinate comparison means, and performing a judgment, when identical coordinates are detected, as to whether the NC program written in blocks between a block of the detected coordinates and the block skip end command can be transformed into an electronic cam program or not; a movement judgment means for performing a judgment, when "no good" is given as a result of the judgment by the transformation judgment means, as to whether a command causing "no good" of transformation can be moved to the rear of the block of the detected coordinates without any trouble; and a "no good" causal command moving means for moving the command causing "no good" of transformation to a line on the rear of the block of the detected coordinates when "good" is given as a result of the judgment by the movement judgment means.

(6) The invention further provides a numerical control apparatus for machine tool, comprising: an NC program storage portion for storing an NC program generated for machining a material into a desired shape; a block skip command detection means for detecting whether a block skip command for skipping execution of blocks after a position where the block skip command is described is present in the NC program stored in the NC program storage portion or not; a block skip end command detection means for detecting whether a block skip end command provided in connection with the block skip command to permit execution of blocks after a position where the block skip end command is described is present in the NC program stored in the NC program storage portion or not; a block skip erasure judgment means for judging whether both the block skip command and the block skip end command detected by the block skip command detection means and the block skip end command detection means respectively can be erased or not; a block skip erasure means for erasing the block skip command and the block skip end command when the block skip erasure judgment means makes a decision that these commands can be detected; and a program transformation means for transforming the NC program into an electronic cam program.

(7) The invention further provides a numerical control method for machine tool, comprising the steps of: (a) reading an NC program; (b) applying a predetermined block skip pre-process to the NC program read by the step (a); and (c) transforming the NC program subjected to the predetermined block skip pre-process by the step (b) into electronic cam data.

(8) The invention further provides a numerical control method for machine tool according to the paragraph (7), wherein the step (b) includes the steps of: (b-1) performing a block skip erasure process for erasing erasable block skip destinations and erasable block skip sources; and (b-2) applying a block skip destination changing process to at least one block skip remaining after erasure by the step (b-1).

(9) The invention further provides a numerical control method for machine tool according to the paragraph (8), wherein the step (b-1) includes the steps of: (b-1-1) performing a judgment, when there are a plurality of block skip processes, as to whether all commands between a block skip destination and a next block skip source are only commands having no influence on electronic cam data transformation; and (b-1-2) erasing the block skip destination and the next block skip source when the judgment in the step (b-1-1) makes a decision that there are only commands having no influence on electronic cam data transformation.

(10) The invention further provides a numerical control method for machine tool according to the paragraph (8), wherein the step (b-2) includes the steps of: (b-2-1) comparing coordinates of the block skip source with coordinates of the block skip destination to thereby judge whether the coordinates of the block skip source are the same as the coordinates of the block skip destination or not; (b-2-2) searching for a coordinate command identical to the coordinates of the block skip source after the judgment when the judgment of the step (b-2-1) makes a decision that the coordinates of the block skip source are different from the coordinates of the block skip destination; (b-2-3) judging whether all commands between the new coordinate command searched for by the step (b-2-2) and the coordinates of the block skip destination are only commands having no influence on electronic cam data transformation; and (b-2-4) moving the block skip destination command to the rear of the new coordinate command when the judgment in the step (b-2-3) makes a decision that there are only commands having no influence on electronic cam data transformation.
(11) The invention further provides a numerical control method for machine tool according to the paragraph (10), further comprising the steps of: (d) performing a judgment, when there is a decision that all commands between the new coordinate command and the coordinates of the block skip destination are not only commands having no influence on electronic cam data transformation, as to whether a command having influence on electronic cam data transformation can be moved to the rear of the new coordinate command or not; (e) moving the command having influence on electronic cam data transformation to the rear of the new coordinate command when the judgment in the step (d) makes a decision that the command having influence on electronic cam data transformation can be moved without any trouble; and (f) further moving the block skip destination command to the rear of the new coordinate command.
(12) The invention further provides a numerical control method for machine tool according to the paragraph (10), wherein the judgment as to whether the coordinates are the same or not is based on selected tool numbers.

That is, in the numerical control apparatus for machine tool according to the invention, when a block skip command is detected by the block skip command detection means and a block skip end command is detected by the block skip end command detection means and comparison between coordinates in the block skip command and coordinates in the block skip end command is made by the coordinate comparison means to judge whether the coordinates in the block skip command are the same as the coordinates in the block skip end command, at least a judgment can be made as to whether an NC program can be transformed into an electronic cam program.

On this occasion, it is conceived that the coordinate comparison means may perform comparison between the coordinates on the basis of selected tool numbers to thereby easily judge whether the coordinates in the block skip command are the same as the coordinates in the block skip end command.

It is also conceived that a block skip erasing means is provided for performing a process of erasing erasable block skip end commands and erasable block skip commands at the time of transformation of the NC program into the electronic cam program when a plurality of block skip command-block skip end command combinations are present in the NC program. In this configuration, efficiency in transformation into the electronic cam program can be improved.

Further, there may be provided: a transformation judgment means for searching for "good" coordinates after the block skip end command when "no good" is decided as a result of comparison by the coordinate comparison means, and performing a judgment, when identical coordinates are detected, as to whether the NC program written in blocks between a block of the detected coordinates and the block skip end command can be transformed into an electronic cam program or not; and a moving means for moving the block skip end command to the rear of a line on which the coordinates are detected when "good" is obtained as a result of the judgment by the transformation judgment means. In this configuration, efficiency in transformation into the electronic cam program can be improved.

Further, there may be provided: a transformation judgment means for searching for "good" coordinates after the block skip end command when "no good" is decided as a result of comparison by the coordinate comparison means, and performing a judgment, when identical coordinates are detected, as to whether the NC program written in blocks between a block of the detected coordinates and the block skip end command can be transformed into an electronic cam program or not; a movement judgment means for performing a judgment, when "no good" is given as a result of the judgment by the transformation judgment means, as to whether a command causing "no good" of transformation can be moved to the rear of the block of the detected coordinates without any trouble; and a "no good" causal command moving means for moving the command causing "no good" of transformation to a line on the rear of the block of the detected coordinates when "good" is given as a result of the judgment by the movement judgment means. In this configuration, efficiency in transformation into the electronic cam program can be improved.

Further, there may be provided: an NC program storage portion for storing an NC program generated for machining a material into a desired shape; a block skip command detection means for detecting whether a block skip command for skipping execution of blocks after a position where the block skip command is described is present in the NC program stored in the NC program storage portion or not; a block skip end command detection means for detecting whether a block skip end command provided in connection with the block skip command to permit execution of blocks after a position where the block skip end command is described is present in the NC program stored in the NC program storage portion or not; a block skip erasure judgment means for judging whether both the block skip command and the block skip end command detected by the block skip command detection means and the block skip end command detection means respectively can be erased or not; a block skip erasure means for erasing the block skip command and the block skip end command when the block skip erasure judgment means makes a decision that these commands can be detected; and a program transformation means for transforming the NC program into an electronic cam program. In this configuration, the possibility of transformation into the electronic cam program can be improved because transformation into the electronic cam program is executed in the condition that erasable block skip processes are erased to reduce the number of block skip processes.

Each of the paragraphs (7) to (12) may be provided in the form of a program claim.

BRIEF DESCRIPTION OF THE DRAWINGS

The present invention may be more readily described with reference to the accompanying drawings.

DETAILED DESCRIPTION OF THE PREFERRED EMBODIMENTS

An embodiment of the invention will be described below with reference to FIGS. 1 to 7.

Figure 1:
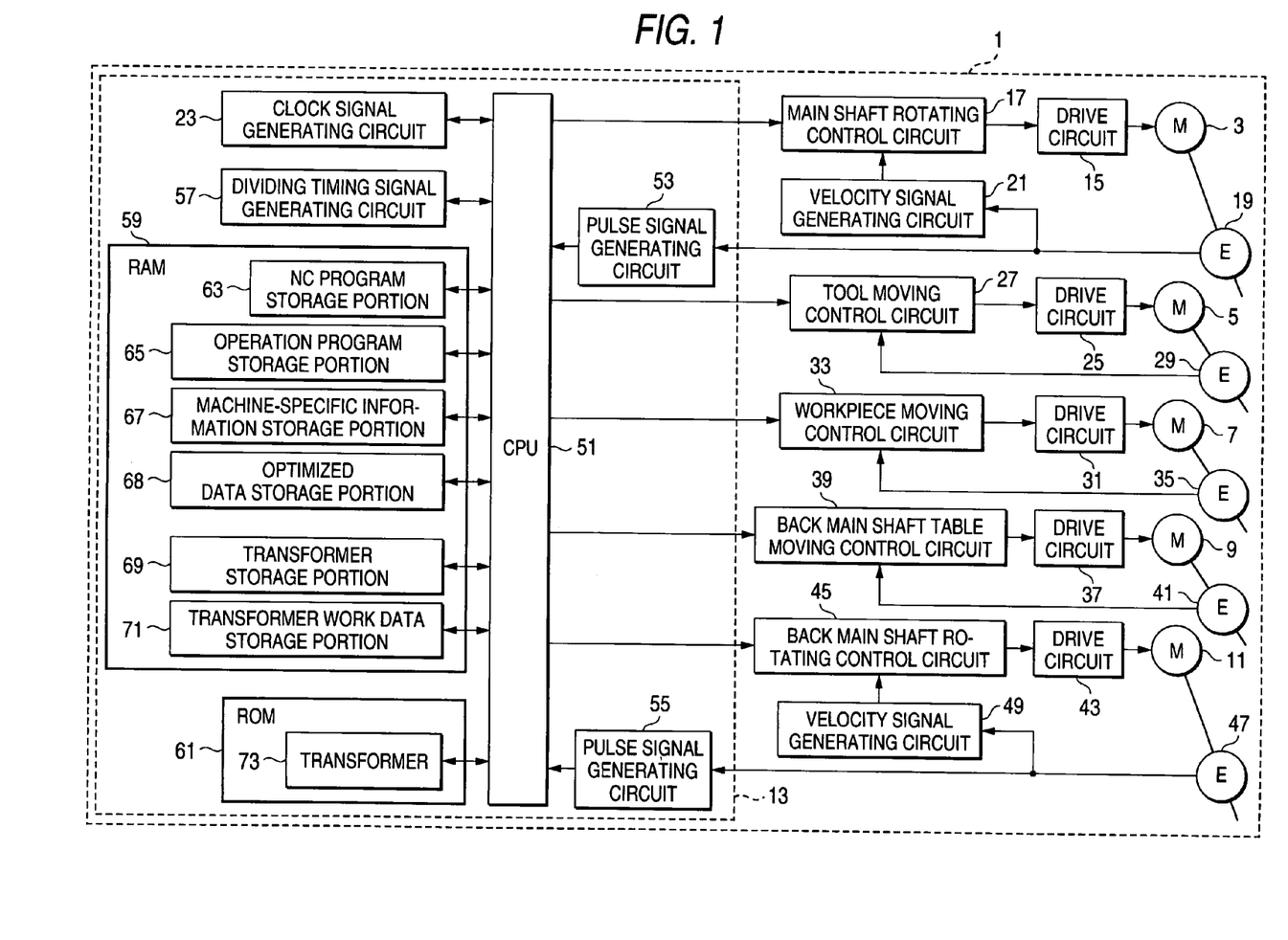
FIG. 1 is a block diagram showing the configuration of a numerical control machine tool according to an embodiment of the invention.
Figure 2:
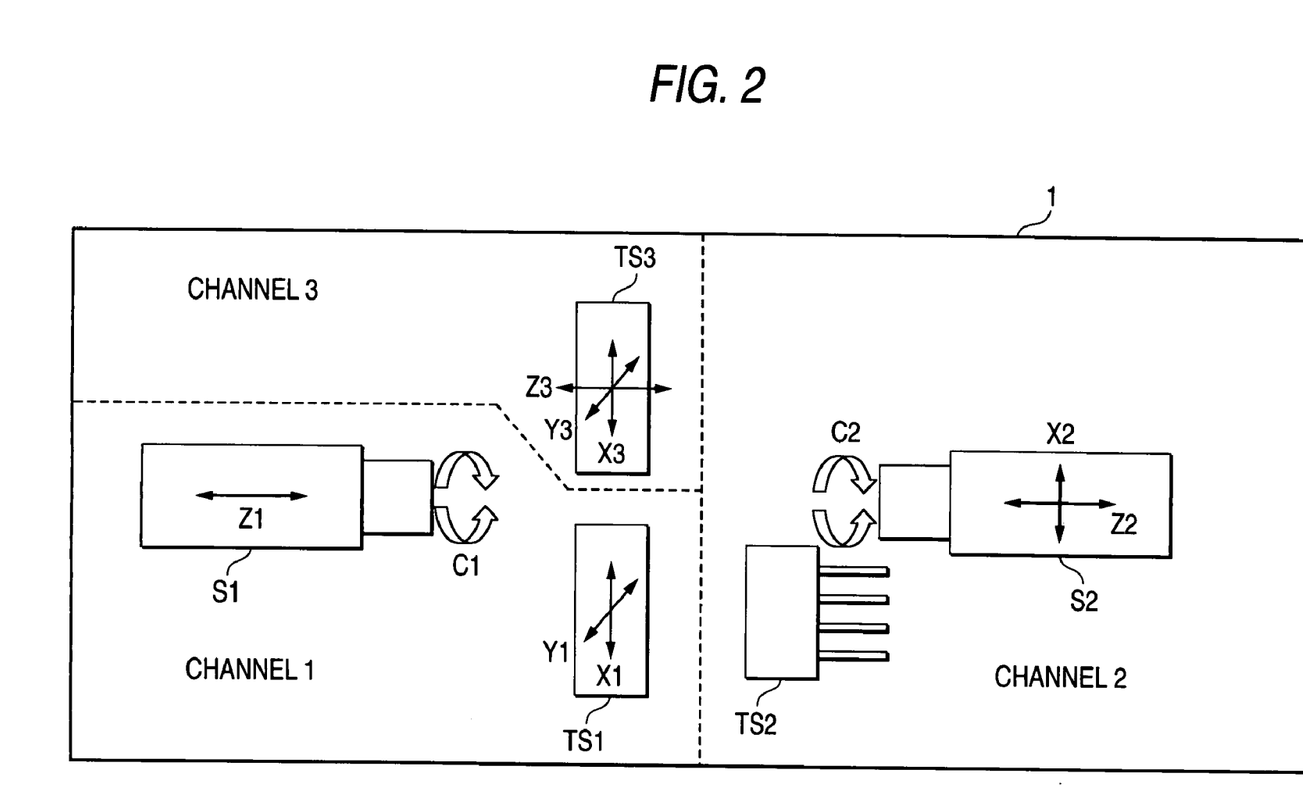
FIG. 2 is a plan view showing the channel configuration of the numerical control machine tool according to the embodiment of the invention.

FIG. 1 is a block diagram showing the overall configuration of a numerical control machine tool according to this embodiment. FIG. 2 is a plan view showing the schematic control axis configuration of the numerical control machine tool.

In FIG. 1, the numerical control machine tool 1 includes a main shaft rotating motor 3, a tool moving motor 5, a workpiece moving motor 7, a back main shaft moving motor 9, a back main shaft rotating motor 11, and a control unit portion 13 for controlling drives of the main shaft rotating motor 3, the tool moving motor 5, the workpiece moving motor 7, the back main shaft moving motor 9 and the back main shaft rotating motor 11.

The main shaft rotating motor 3 is provided so that a main shaft (designated by the symbol S1 in FIG. 2) formed so as to be able to hold a workpiece is driven to rotate. The main shaft rotating motor 3 is connected to the control unit portion 13 through a drive circuit 15 and a main shaft rotating control circuit 17. The main shaft rotating motor 3 is provided with a pulse encoder 19 for detecting rotation of the main shaft rotating motor 3. An output of the pulse encoder 19 is connected to the control unit portion 13 and a velocity signal generating circuit 21, so that a rotation detection signal output from the pulse encoder 19 is supplied to the control unit portion 13 and the velocity signal generating circuit 21. The pulse encoder 19 generates a rotation detection signal in synchronism with the rotation of the main shaft rotating motor 3 and supplies the rotation detection signal to the control unit portion 13 and the velocity signal generating circuit 21. The velocity signal generating circuit 21 converts the rotation detection signal output from the pulse encoder 19 into a main shaft rotation velocity signal expressing the rotational velocity of the main shaft rotating motor 3. An output of the velocity signal generating circuit 21 is connected to the main shaft rotating control circuit 17, so that the main shaft rotation velocity signal obtained by conversion is supplied to the main shaft rotating control circuit 17.

The main shaft rotating control circuit 17 is provided for controlling the rotation of the workpiece (grasped on the main shaft S1) by referring to a clock signal generated/output from a clock signal generating circuit 23 so that the workpiece can rotate at a desired rotational velocity. The main shaft rotating control circuit 17 compares the main shaft rotation velocity signal output from the velocity signal generating circuit 21 with a main shaft rotation velocity command signal output from the control unit portion 13 and generates a control signal corresponding to the difference between the main shaft rotation velocity signal and the main shaft rotation velocity command signal by referring to the clock signal. The control signal generated by the main shaft rotating control circuit 17 is supplied to the drive circuit 15.

The drive circuit 15 controls electric power supplied to the main shaft rotating motor 3 (main shaft S1) on the basis of the control signal output from the main shaft rotating control circuit 17 so that the rotational velocity of the main shaft rotating motor 3 is set at a main shaft rotation velocity command value which will be described later. The drive circuit 15, the main shaft rotating control circuit 17 and the velocity signal generating circuit 21 form a feedback control system for feeding back the rotational velocity of the main shaft rotating motor 3 (main shaft S1).

Next, the tool moving motor 5 is provided so that tools (such as turning cutters designated by the symbols TS1 and TS3 in FIG. 2) for machining the workpiece are moved, for example, in directions (X-axis direction or Y-axis direction) perpendicular to the rotation center axis of the main shaft rotating motor 3 (main shaft S1) and in a direction (Z-axis direction) parallel to the main shaft. The tool moving motor 5 is connected to the control unit portion 13 through a drive circuit 25 and a tool moving control circuit 27.

Incidentally, in this embodiment, as shown in FIG. 2, the tool TS1 is formed so as to be controlled to move in the X1-axis direction and the Y1-axis direction whereas the tool TS3 is formed so as to be controlled to move in the X3-axis direction, the Y3-axis direction and the Z3-axis direction.

Besides the tools TS1 and TS3, a back machining tool TS2 is provided.

The tool moving motor 5 is provided with a pulse encoder 29 for detecting the rotation of the tool moving motor 5. An output of the pulse encoder 29 is connected to the tool moving control circuit 27, so that a rotation detection signal output from the pulse encoder 29 is supplied to the tool moving control circuit 27. The pulse encoder 29 generates a rotation position signal at intervals of a predetermined rotation angle of the tool moving motor 5 and supplies the rotation position signal to the tool moving control circuit 27.

The tool moving control circuit 27 recognizes the actual position of each of the moved tools TS1 and TS3 on the basis of the rotation position signal output from the pulse encoder 29. At the same time, the tool moving control circuit 27 compares the recognized actual position of each of the moved tools TS1 and TS3 with a tool position command signal output from the control unit portion 13 (which will be described later) and generates a tool drive signal on the basis of a result of the comparison. The tool drive signal generated by the tool moving control circuit 27 is supplied to the drive circuit 25. The drive circuit 25 controls electric power supplied to the tool moving motor 5 on the basis of the tool drive signal output from the tool moving control circuit 27. The drive circuit 25 and the tool moving control circuit 27 form a feedback control system for feeding back the positions of the moved tools TS1 and TS3.

Next, the workpiece moving motor 7 is provided for moving the workpiece, for example, in a direction (Z1-axis direction) parallel to the rotation center axis of the main shaft rotating motor 3 (main shaft S1). The workpiece moving motor 7 is connected to the control unit portion 13 through a drive circuit 31 and a workpiece moving control circuit 33. The workpiece moving motor 7 is provided with a pulse encoder 35 for detecting the rotation of the workpiece moving motor 7. An output of the pulse encoder 35 is connected to the workpiece moving control circuit 33, so that a rotation detection signal output from the pulse encoder 35 is supplied to the workpiece moving control circuit 33. The pulse encoder 35 generates a rotation detection signal at intervals of a predetermined rotation angle of the workpiece moving motor 7 an supplies the rotation detection signal to the workpiece moving control circuit 33.

The workpiece moving control circuit 33 recognizes the actual position of the moved workpiece on the basis of the rotation detection signal output from the pulse encoder 35.

At the same time, the workpiece moving control circuit 33 compares the recognized actual position of the moved workpiece with a workpiece position command signal output from the control unit portion 13 and generates a workpiece drive signal on the basis of a result of the comparison. The workpiece drive signal generated at intervals of the predetermined rotation angle is supplied to the drive circuit 31. The drive circuit 31 controls electric power supplied to the workpiece moving motor 7 on the basis of the workpiece drive signal output at intervals of the predetermined rotation angle. The drive circuit 31 and the workpiece moving control circuit 33 form a feedback control system for feeding back the position of the moved workpiece.

Next, the back main shaft table moving motor 9 is provided for moving a back main shaft S2, for example, in a direction (Z2-axis direction) parallel to the rotation center axis of the main shaft rotating motor 3 (main shaft S1) and in a direction (X2-axis direction) perpendicular to the Z2-axis direction. The back main shaft table moving motor 9 is connected to the control unit portion 13 through a drive circuit 37 and a back main shaft table moving control circuit 39. The back main shaft table moving motor 9 is provided with a pulse encoder 41 for detecting the rotation of the back main shaft table moving motor 9. An output of the pulse encoder 41 is connected to the back main shaft table moving control circuit 39, so that a rotation detection signal output from the pulse encoder 41 is supplied to the back main shaft table moving control circuit 39. The pulse encoder 41 generates a rotation position signal at intervals of a predetermined rotation angle of the back main shaft table moving motor 9 and supplies the rotation position signal to the back main shaft table moving control circuit 39.

The back main shaft table moving control circuit 39 recognizes the actual position of the moved back main shaft S2 on the basis of the rotation position signal output from the pulse encoder 41. At the same time, the back main shaft table moving control circuit 39 compares the recognized actual position of the moved back main shaft S2 with a back main shaft table position command signal output from the control unit portion 13 (which will be described later) and generates a back main shaft table drive signal on the basis of a result of the comparison. The back main shaft table drive signal generated by the back main shaft table moving control circuit 39 is supplied to the drive circuit 37. The drive circuit 37 controls electric power supplied to the back main shaft table moving motor 9 on the basis of the drive signal output from the back main shaft table moving control circuit 39. The drive circuit 37 and the back main shaft table moving control circuit 39 form a feedback control system for feeding back the position of the moved back main shaft table.

Next, the back main shaft rotating motor 11 is provided so that the back main shaft S2 formed so as to be able to hold the workpiece is driven to rotate in a C2 direction. The back main shaft rotating motor 11 is connected to the control unit portion 13 through a drive circuit 43 and a back main shaft rotating control circuit 45. The back main shaft rotating motor 11 is provided with a pulse encoder 47 for detecting the rotation of the back main shaft rotating motor 11. An output of the pulse encoder 47 is connected to the control unit portion 13 and a velocity signal generating circuit 49, so that a rotation detection signal output from the pulse encoder 47 is supplied to the control unit portion 13 and the velocity signal generating circuit 49. The pulse encoder 47 generates a rotation detection signal in synchronism with the rotation of the back main shaft rotating motor 11 (back main shaft S2) and supplies the rotation detection signal to the control unit portion 13 and the velocity signal generating circuit 49.

The velocity signal generating circuit 49 converts the rotation detection signal output from the pulse encoder 47 into a back main shaft rotation velocity signal indicating the rotational velocity of the back main shaft rotating motor 11 (back main shaft S2). An output of the velocity signal generating circuit 49 is connected to a back main shaft rotating control circuit 45, so that the back main shaft rotation velocity signal obtained by the conversion is supplied to the back main shaft rotating control circuit 45.

The back main shaft rotating control circuit 45 is provided for controlling the rotation of the workpiece (back main shaft S2) to obtain a desired rotational velocity by referring to the clock signal generated and supplied by the clock signal generating circuit 23. The back main shaft rotating control circuit 45 compares the back main shaft rotation velocity signal output from the velocity signal generating circuit 49 with a back main shaft rotation velocity command signal output from the control unit portion 13 and generates a control signal corresponding to the difference between the back main shaft rotation velocity signal and the back main shaft rotation velocity command signal by referring to the clock signal. The control signal generated by the back main shaft rotating control circuit 45 is supplied to the drive circuit 43.

The drive circuit 43 controls electric power supplied to the back main shaft rotating motor 11 on the basis of the control signal output from the back main shaft rotating control circuit 45 so that the rotational velocity of the back main shaft rotating motor 11 (back main shaft S2) is set at a back main shaft rotation velocity command value which will be described later. The drive circuit 43, the back main shaft rotating control circuit 45 and the velocity signal generating circuit 49 form a feedback control system for feeding back the rotational velocity of the back main shaft rotating motor 11 (back main shaft S2).

As shown in FIG. 1, the control unit portion 13 has a central processing unit (CPU) 51, pulse signal generating circuits 53 and 55, a clock signal generating circuit 23 as described above, a dividing timing signal generating circuit 57, an RAM 59, and an ROM 61.

The CPU 51 is a computing portion for conducting signal processing of the control unit portion 13 as a whole. The CPU 51 performs known multiprocessing. Multiprocessing is used for processing a plurality of jobs (programs) apparently simultaneously in such a manner that the plurality of programs are stored in advance and executed while switched in a short time. There is known multiprocessing of the type performing time-division processing or multiprocessing of the type performing task processing while switching respective jobs in order of set priority.

The pulse signal generating circuits 53 and 55 are connected to the pulse encoders 19 and 47 respectively. The rotation detection signals output from the pulse encoders 19 and 47 respectively are supplied to the pulse signal generating circuits 53 and 55 through an interface (I/F) not shown. Each of the pulse signal generating circuits 53 and 55 is formed to generate a pulse signal at intervals of a predetermined rotation angle on the basis of the rotation detection signal received. The pulse signal generating circuits 53 and 55 are also connected to the CPU 51. Each of the pulse signal generating circuits 53 and 55 is formed so that the pulse signal generated at intervals of the predetermined rotation angle is supplied to the CPU 51. In this embodiment, each of the pulse signal generating circuits 53 and 55 is formed so that 4096 pulses are output at regular intervals in synchronism with the main shaft rotating motor 3 (main shaft S1) or the back main shaft rotating motor 11 (back main shaft S2) while the main shaft rotating motor 3 (main shaft S1) or the back main shaft rotating motor 11 (back main shaft S2) makes one rotation.

The clock signal generating circuit 23 is formed so that a clock signal is generated and output at intervals of a predetermined period, for example, of 0.25 msec when a predetermined command signal output from the CPU 51 is received by the clock signal generating circuit 23. The clock signal generated by the clock signal generating circuit 23 is supplied to the dividing timing signal generating circuit 57. The dividing timing signal generating circuit 57 is formed to count the number of pulses in the clock signal output from the clock signal generating circuit 23. For example, as a result of the counting, a dividing timing signal is generated and supplied to the CPU 51 at intervals of 1 msec. Accordingly, the dividing timing signal generating circuit 57 outputs a 1 msec-cycle dividing timing signal as an interrupt timing signal which will be described later so that the interrupt timing signal is supplied to the CPU 51.

Incidentally, the cycle of each of the clock signal and the dividing timing signal is not limited to the aforementioned value and can be set suitably in accordance with, the throughput of the CPU 51, the resolving power of each of the pulse encoders 29, 35 and 41 and the performance of each of the motors 3, 5, 7 and 9.

The RAM 59 is formed to temporarily store results of various computations by the CPU 51 so that the results can be read from the RAM 59. The RAM 59 contains an NC program storage portion 63, an operation program storage portion 65, a machine-specific information storage portion 67, an optimized data storage portion 68, a transformer storage portion 69, and a transformer work data storage portion 71. The RAM 59 is formed to temporarily store results of various computations by the CPU 51 so that the results can be read from the RAM 59.

The NC program storage portion 63 is an area for storing a plurality of NC programs for machining various workpieces respectively. When an operation input device not shown is operated to make access to this storage area, a desired machining NC program can be selected from the plurality of NC programs.

The operation program storage portion 65 is an area for storing an NC program or an electronic cam program for actually operating the numerical control machine tool 1. That is, when the machine tool 1 is to be operated by an NC program, selected one of the NC programs stored in the NC program storage portion 63 is loaded into the operation program storage portion 65 or an NC program generated through a monitor provided on an NC operation panel (not shown) is directly loaded into this area. On the other hand, when the machine tool 1 is to be operated by an optimized program inclusive of an electronic cam program, only an optimized main program is loaded into the operation program storage portion 65. (The optimized program is substantially equivalent to an NC program though the optimized program is specific at the point that the optimized program contains electronic cam codes.)

The machine-specific information storage portion 67 is an area, for example, provided for storing offset values of tools TS1, TS2 and TS3.

The ROM 61 is a storage portion for storing various kinds of machining programs inclusive of the transformer 73. Electronic cam control commands are also stored in the ROM 61.

The optimized data storage portion 68 is set as an area for storing data referred to by commands written in the optimized main program generated by optimization and transformation of the NC program. The optimized data per se are provided as a table of data indicating the loci of movement of the tools and data indicating the functions of M, G and T codes.

As described above, an NC program required for actually performing machining is stored in the operation program storage portion 65 of the RAM 59. The operation program storage portion 65 includes a first channel machining procedure storage portion, a second channel machining procedure storage portion, and a third channel machining procedure storage portion.

A portion actually operated by the NC program stored in the first, second and third channel machining procedure storage portions will be described with reference to FIG. 2.

First, the main shaft rotating motor 3 for rotating the main shaft S1, the workpiece moving motor 7 and the tool moving motor 5 are controlled by the NC program stored in the first channel machining procedure storage portion. As a result, the main shaft S1 is controlled to move in the Z1-axis direction represented by the arrow in FIG. 2 and rotate in the C1-rotation direction. On the other hand, the tool TS1 is controlled to move in the X1-axis and Y1-axis directions represented by the arrow in FIG. 2. Control in channel 1 includes moving and rotating control of the main shaft table, moving control of the tool post for supporting the tool TS1 in respective arrow directions, and rotating control of a rotary tool if the rotary tool is included in the tool TS1 and needs to be controlled.

Next, the back main shaft rotating motor 11 for rotating the back main shaft S2, the back main shaft moving motor 9 and rotation of the tool TS2 are controlled by the NC program stored in the second channel machining procedure storage portion. As a result, the back main shaft S2 is controlled to move in the Z2-axis and X2-axis directions represented by the arrows in FIG. 2 and rotate in the C2-rotation direction. On the other hand, the tool TS2 per se is placed in a fixed tool post. A non-movable tool such as a cutter or a rotary tool such as a drill can be mounted as the tool TS2. When a rotary tool such as a drill is used as the tool TS2, rotation of the tool TS2 is controlled by the NC program stored in the second channel machining procedure storage portion.

Next, the tool moving motor 5 is controlled by the NC program stored in the third channel machining procedure storage portion. As a result, the tool TS3 is controlled to move in the X3-axis, Y3-axis and Z3-axis directions represented by the arrows in FIG. 2. Control in cannel 3 includes moving control of the tool post supporting the tool TS3, and rotating control of a rotary tool if the rotary tool is included in the supported tool and needs to be controlled.

Although this embodiment has been described on the case where the tools TS3, TS2 and TS1 are allocated to channels 3, 2 and 1 respectively, the allocation of the tools TS1, TS2 and TS3 to channels may be appropriately changed in accordance with necessity. For example, the tool TS1 or TS3 may be controlled in any channel. Similarly, the allocation of the main shaft S1 and the back main shaft S2 to channels may be changed.

The operation of this embodiment will be described below on the basis of the aforementioned configuration.

For example, in an NC program pattern of a numerical control machine tool having an ability of back machining (the numerical control machine tool 1 according to this embodiment is configured in this manner), an NC program portion for back machining is generally sandwiched between commands for block skip machining except for the time requiring machining so that a tool does not interfere with an ejector pin protruded from a back main shaft S2. A procedure for transforming such an NC program into an electronic cam program will be described with reference to FIGS. 3 to 6 which are flow charts.

Figure 3:
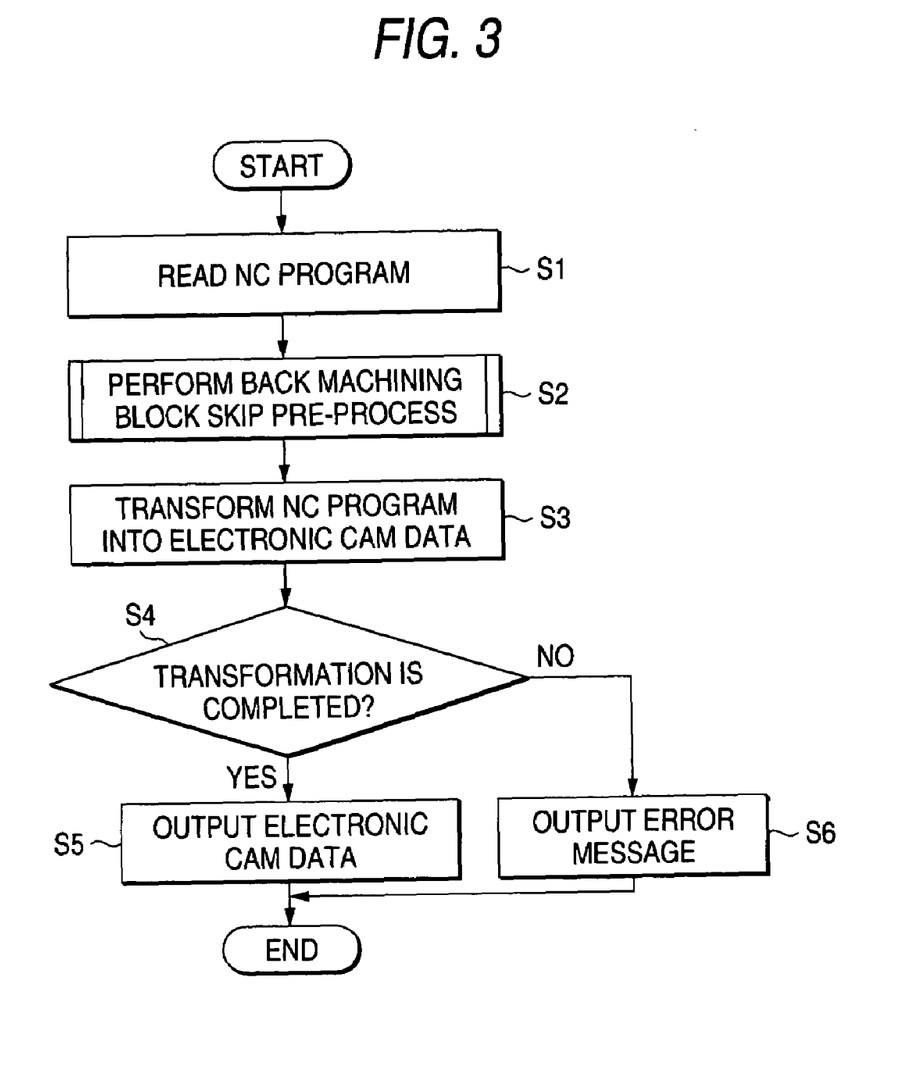
FIG. 3 is a flow chart showing the main procedure of a control program in the embodiment of the invention.

First, a rough flow of processing will be described with reference to FIG. 3. First, in step S1, an NC program to be transformed into electronic cam data is read into a memory. Then, in step S2, a back machining block skip pre-process is executed. Then, in step S3, the NC program is transformed into electronic cam data. Then, in step S4, a judgment is made as to whether transformation of the NC program into the electronic cam data is completed or not.

When a decision is made in the step S4 that transformation of the NC program into the electronic cam data is completed, the electronic cam data are output as a file (step S5). On the other hand, when transformation of the NC program into the electronic cam data is not completed, an error massage indicating the reason of error is output (step S6) and the routine is terminated.

A rough flow of processing has been described above.

Figure 4:
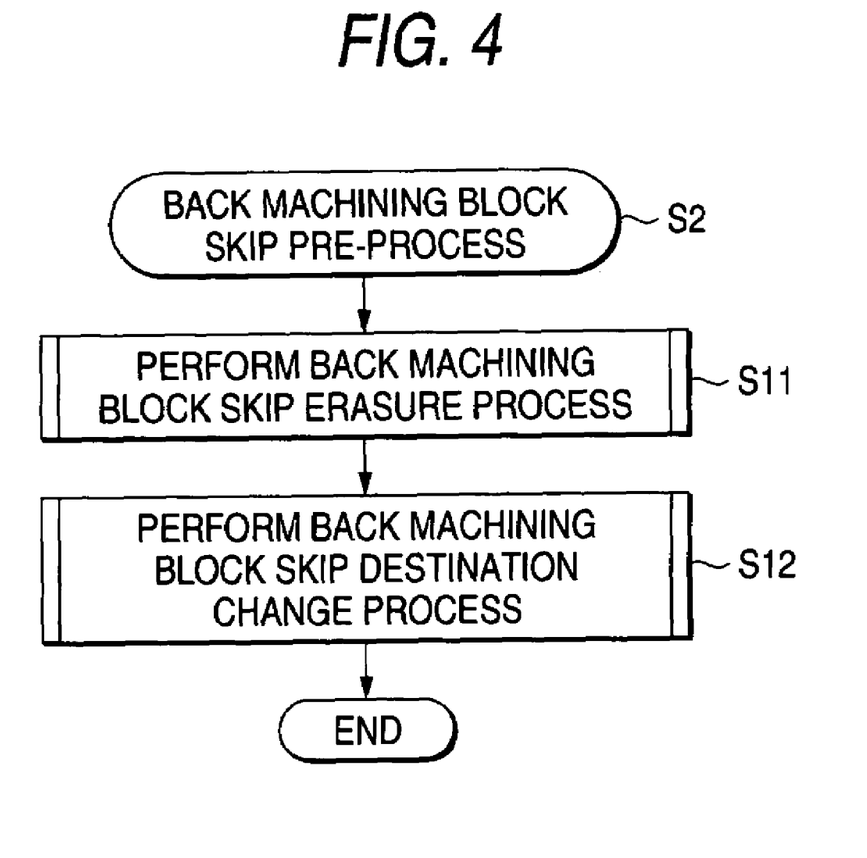
FIG. 4 is a flow chart showing the contents of a back machining block skip pre-process in the embodiment of the invention.

Next, the "back machining block skip pre-process" in the step S2 will be described with reference to FIG. 4. First, in step S11, erasable back machining block skip commands are erased. Then, in step S12, remaining back machining block skip commands are subjected to a back machining block skip destination change process.

Figure 5:
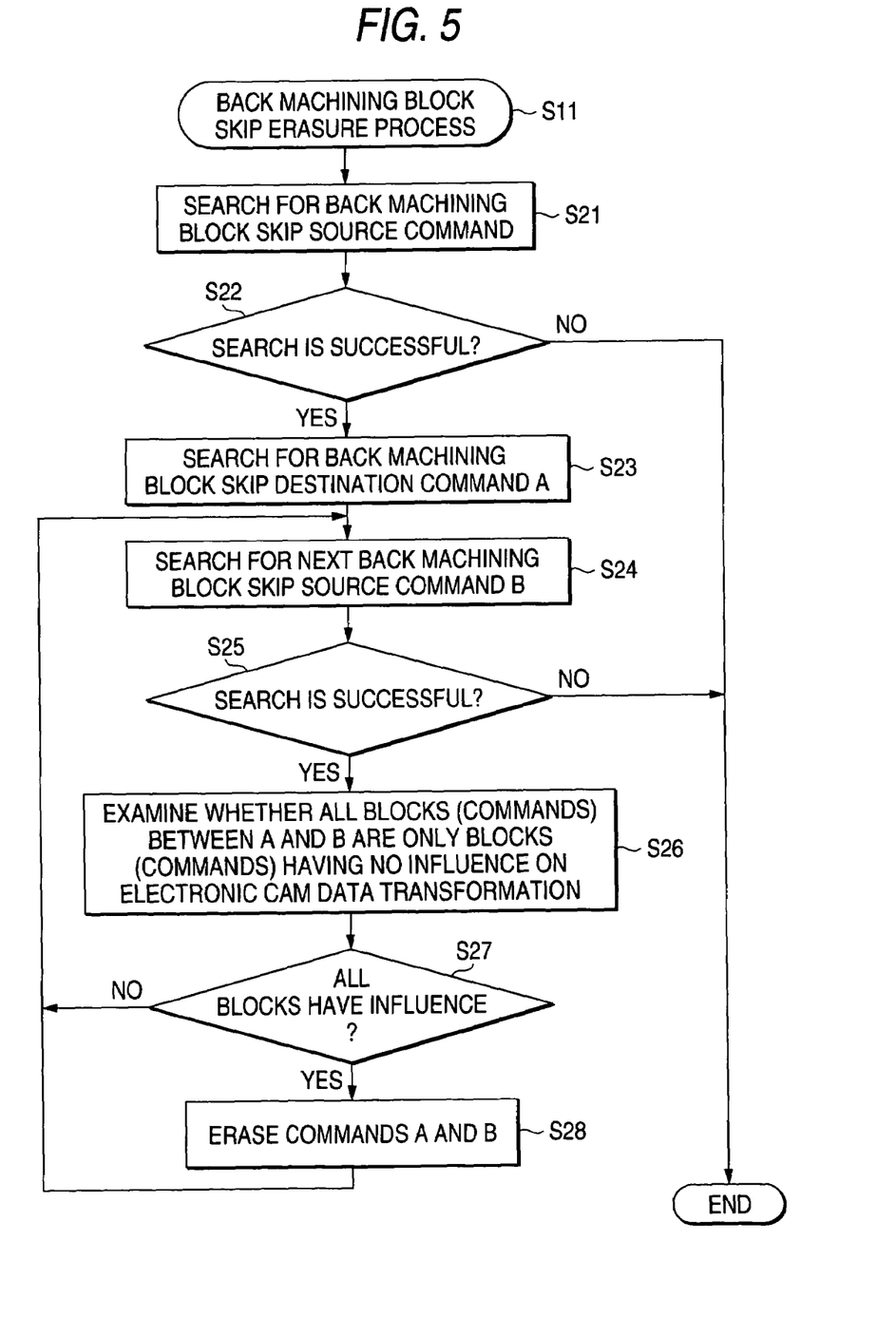
FIG. 5 is a flow chart showing the contents of a back machining block skip erasure process in the back machining block skip pre-process in the embodiment of the invention.

The back machining block skip command erasure process in the step S11 will be described in detail with reference to FIG. 5. First, in step S21, a back machining block skip source command is searched for.

Incidentally, in the actual NC program, the back machining block skip source command is expressed as "M75".

Then, in step S22, a judgment is made as to whether the search is successful or not. When the search is not successful, the routine is terminated because the NC program has no back machining block skip. On the other hand, when the search is successful, the current position of the routine goes to step S23 in which a back machining block skip destination command A is searched for. Incidentally, in the actual NC program, the back machining block skip destination command is expressed as "EM75".

Then, the current position of the routine goes to step S24 in which a next back machining block skip source command B is searched for. Then, in step S25, a judgment is made as to whether the search is successful or not. When the search is not successful, the routine is terminated because there has been no back machining block skip command to be erased. On the other hand, when the search is successful, a judgment is made as to whether all blocks (commands) between the back machining block skip destination command A (EM75) and the next back machining block skip source command B (M75) are only blocks (commands) having no influence on electronic cam data transformation (step S26).

Incidentally, the "blocks having no influence on electronic cam data transformation" include: blocks insignificant for NC program operation such as blocks having only EOB (line feed), comments, message display commands or sequence numbers; and wait commands necessary for NC program operation but unnecessary for electronic cam operation. In NC program operation, if a wait command is skipped, the program is stopped because a wait command paired with the skipped wait command waits for the skipped wait command forever when it is executed. In electronic cam operation, however, the wait command is not output actually because data have been already generated at timing based on the wait command. Accordingly, if the electronic cam data are generated while consideration is given to waiting, there is no problem though the wait command is skipped.

Figure 7:
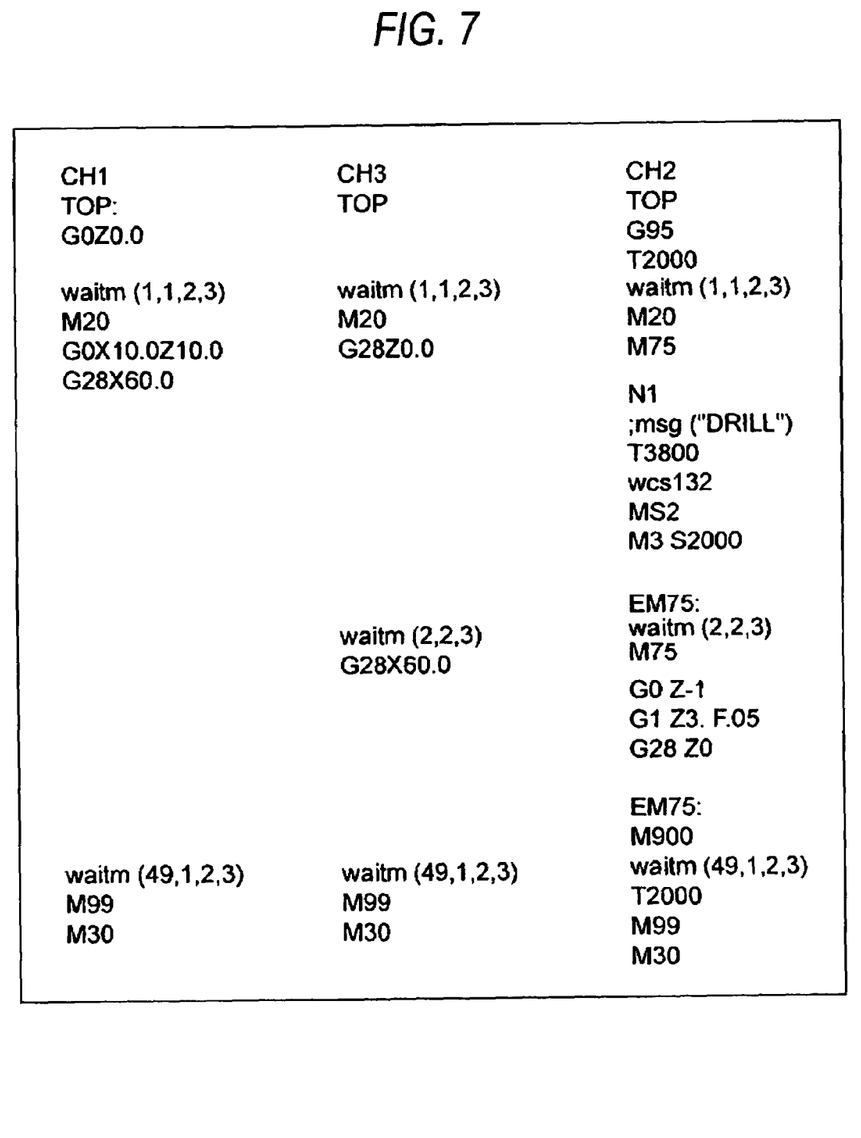
FIG. 7 is a view showing an example of the NC program in the embodiment of the invention.

"M900 (written in the fifth lower most line in CH2)" which is a code shown in FIG. 7 can be taken as another example. This code is a command for returning processing to the top of the program when a predetermined condition is satisfied at the time of the single operation of channel 2. If this code is skipped, machining actually executed in channel 2 cannot be terminated so that an operation as not intended by a program generating person is executed by the machine tool. When measures such as shifting the block having this code written therein to the rear are taken, this code is not skipped so that this code can be transformed into electronic cam data appropriately to avoid bad influence.

Then, the current position of the routine goes to step S27 in which a judgment is made as to whether all blocks have no influence on electronic cam data transformation. When all blocks have no influence on transformation, the current position of the routine goes to step S28 in which commands A and B are erased. Then, the current position of the routine goes back to the step S24 to repeat the aforementioned steps. By the aforementioned steps, erasable back machining block skip destination commands and erasable back machining block skip source commands can be erased among pairs of back machining block skip commands.

Figure 6:
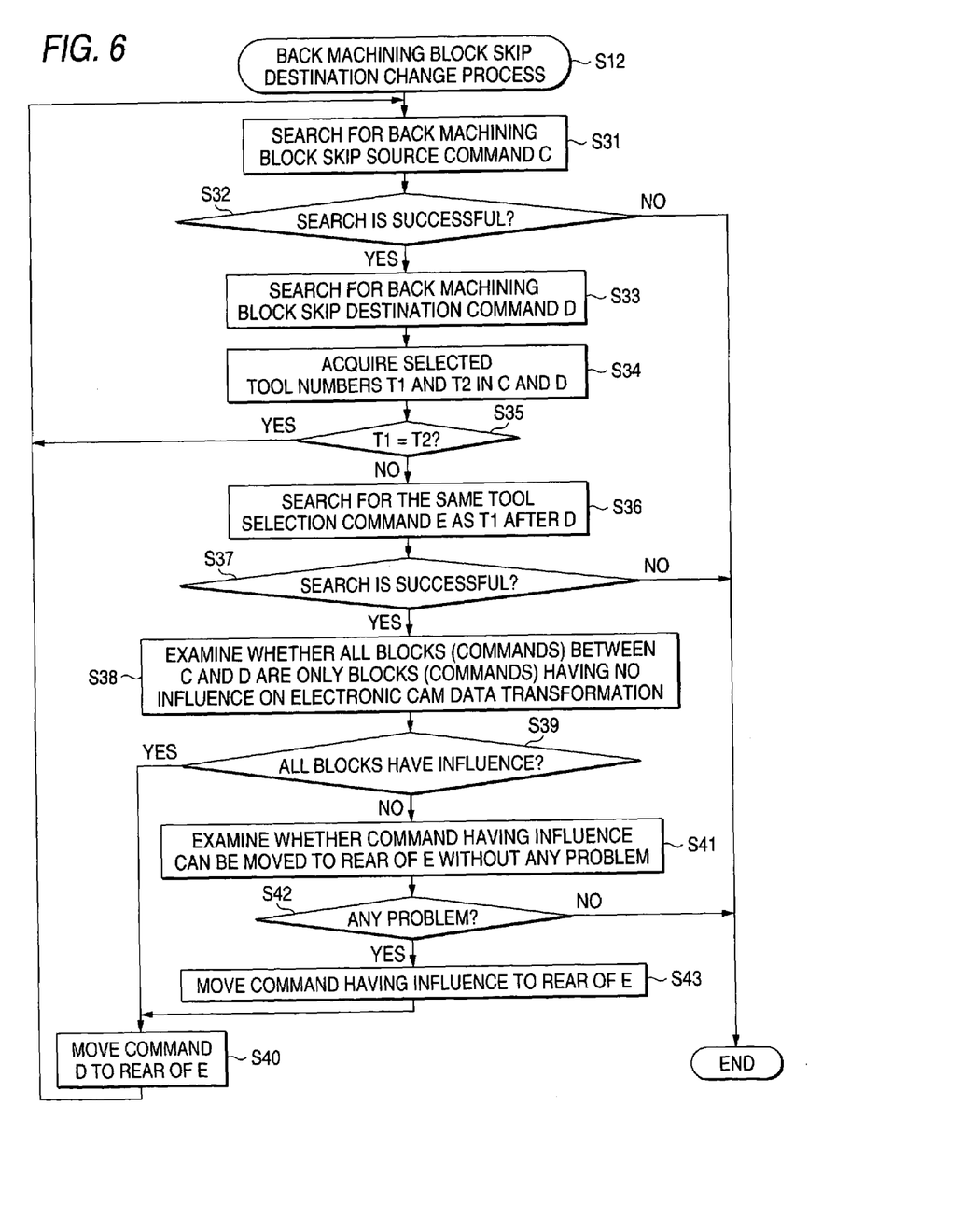
FIG. 6 is a flow chart showing the contents of a back machining block skip destination change process in the back machining block skip pre-process in the embodiment of the invention.

Next, the back machining block skip destination change process in the step S12 will be described with reference to FIG. 6. First, in step S31, a back machining block skip source command C is searched for. Then, in step S32, a judgment is made as to whether the search is successful or not. When the search is not successful, the routine is terminated because machining of all back machining block skip commands is completed. On the other hand, when the search is successful, the current position of the routine goes to step S33 in which a back machining block skip destination command D is searched for.

Then, in step S34, selected tool numbers T1 and T2 are acquired in accordance with the back machining block skip source command C and the back machining block skip destination command D respectively. Then, in step S35, a judgment is made as to whether the selected tool number T1 in the back machining block skip source command C is equal to the selected tool number T2 in the back machining block skip destination command D or not. When a decision is made that the selected tool number T1 is equal to the selected tool number T2, the current position of the routine goes back to the step S31.

Incidentally, the fact that whether the selected tool number T1 in the back machining block skip source command C is equal to the selected tool number T2 in the back machining block skip destination command D means the fact that electronic cam data transformation can be made directly (strictly speaking, there is a possibility that transformation cannot be made). Further details will be given later.

In this manner, the tool numbers can be used for easily comparing the coordinates of the command position of the tool post at the time of the block skip source command with those at the time of the back machining block skip destination command. Although a method of calculating the coordinates of the command position for the tool post and comparing results of the calculation may be used, floating-point calculation is necessary for the method. When the tool selection command is used, the floating-point calculation required in the method can be however replaced by integer calculation to thereby shorten the time required for data processing.

At this stage, it is practically unnecessary to compare coordinates strictly to judge whether the coordinates of the command position of the tool post at the time of the block skip source command are the same as those at the time of the block skip destination command or not. In this sense, rough comparison can be made in the place where rough comparison is required. Accordingly, there can be obtained a practical effect that larger load than required is not applied to the control apparatus.

Incidentally, the reason why strict comparison is not required is that a process for performing the comparison again strictly will be provided when electronic cam data transformation is executed in the step S3. Strict comparison is not required here for checking whether the coordinates of the command position at the time of the block skip source command are quite the same as those at the time of the block skip destination command. That is, any method may be used here if a judgment can be made as to whether the NC program can be transformed into electronic cam data or not.

On the other hand, when a decision is made that the selected tool number T1 in the back machining block skip source command C is not equal to the selected tool number T2 in the back machining block skip destination command D, the current position of the routine goes to step S36 in which a tool selection command E equal to the selected tool number T1 is searched for after the back machining block skip destination command D. That is, the fact that the selected tool number T1 in the back machining block skip source command C is not equal to the selected tool number T2 in the back machining block skip destination command D means the fact that electronic cam data transformation cannot be made directly. Therefore, the new command E having the same selected tool number is searched for so that the skip destination is changed to a position after the command E.

Then, in step 37, a judgment is made as to whether the search is successful or not. When a decision is made that the search is not successful, the routine is terminated without anything else to be done. On the other hand, when a decision is made that the search is successful, the current position of the routine goes to step S38 in which examination is made as to whether all blocks (commands) between the back machining block skip destination command D and the command E are only blocks (commands) having no influence on electronic cam data transformation.

Incidentally, the "blocks having no influence on electronic cam data transformation" are equivalent to those described in the step S26.

Then, in step S39, a judgment is made as to whether the blocks are only blocks having no influence on electronic cam data transformation. When a decision is made that there are only blocks having no influence, the current position of the routine goes to step S40 in which the back machining block skip destination command D is moved to the rear of the command E so that the selected tool number in the back machining block skip source is made equal to the selected tool number in the back machining block skip destination. Then, the current position of the routine goes back to the step S31 to process a next back machining block skip command. On the other hand, when a decision is made that there is any block having influence, the current position of the routine goes to step S41 in which examination is made as to whether there is no problem if the block having influence is moved to the rear of the command E.

Incidentally, for example, a program end command at the time of single operation of back machining is equivalent to the block having no problem when moved. This command serves as a command for terminating cycle machining at the time of single operation of back machining. If this command is skipped, end of machining cannot be judged so that a portion not allowed to be executed will be executed at the time of single operation after that. Accordingly, this command cannot be skipped by changing the skip destination. It is however possible to move this command across the block having no influence on electronic cam data transformation as examined in the step S38. In this case, this command can be provided as a command having no problem as examined in the step S41.

Then, in step S42, a judgment is made where there is no problem. When a decision is made that the command has no problem, the current position of the routine goes to step S43 in which the command having influence is moved to the rear of the command E. Then, the current position of the routine goes to step S40. On the other hand, when a decision is made that the command has any problem, the routine is stopped and terminated immediately because the NC program cannot be transformed into electronic cam data.

The contents of a series of processing in this embodiment have described above.

The actual NC program will be described in brief by way of example. FIG. 7 shows a part of the actual NC program. Respective programs "CH1", "CH2" and "CH3" corresponding to the channels 1, 2 and 3 shown in FIG. 2 are shown in FIG. 7. In this example, back machining block skip commands "M75" and back machining block skip end commands "EM75" are incorporated in the program "CH2" corresponding to the channel 2.

Specifically, in "CH2", a first back machining block skip command "M75" is on the sixth uppermost line, a first back machining block skip end command "EM75" corresponding to the first back machining block skip command "M75" is on the thirteenth uppermost line, a second back machining block skip command "M75" is on the fifteenth uppermost line, and a second back machining block skip end command "EM75" corresponding to the second back machining block skip command "M75" is on the nineteenth uppermost line.

On this occasion, examination is made as to whether block commands between the first back machining block skip end command "EM75" and the second back machining block skip command "M75" are only block commands having no influence on electronic cam data transformation. As a result, it is found that only a command "waitm(2,2,3)" indicating waiting is present there. This case is regarded as the case where the block commands between the first back machining block skip end command "EM75" and the second back machining block skip command "M75" are only block commands having no influence on electronic cam data transformation. Accordingly, the first back machining block skip end command "EM75" and the second back machining block skip command "M75" are erased.

As a result, jumping must be made from the first back machining block skip command "M75" to the second back machining block skip end command "EM75". On this occasion, examination is made as to whether the tool selection command at the time of the first back machining block skip command "M75" is the same as that at the time of the second back machining block skip end command "EM75" or not. The tool at the time of the first back machining block skip command "M75" is "T2000" whereas the tool at the time of the second back machining block skip end command "EM75" is "T3800". That is, the tool selection commands are different from each other. Accordingly, the NC program cannot be transformed into an electronic cam program directly, so that an error message is displayed on a display screen provided in the production apparatus.

Therefore, a process to prevent the error message from being displayed on the display screen is applied to the program as follows. First, as shown in the flow chart of FIG. 6, searching is made as to whether the tool having the tool number "T2000" is designated after the second back machining block skip command "EM75" or not. As a result of the searching, the toll "T2000" is found (because "T2000" is designated on the third line viewed from "EM75"). Accordingly, the searching results in success. A judgment is made as to whether codes written in blocks between "T2000" and the second "EM75" are only codes having no influence on electronic cam data transformation. Because these codes are only codes having no influence on electronic cam data transformation as described above, "EM75" is moved to the rear of "T2000". As a result of this processing, when jumping is made from "M75" to "EM75" or when "M75" is inoperative so that all blocks between "M75" and "EM75" are executed, the tool at the point of time of execution of "EM75" can be made equal to the tool designated a the point of time of execution of "M75". Accordingly, transformation into electronic cam data can be completed.

Incidentally, in the case of the NC program shown in FIG. 7, the tool selection commands in the back machining block skip command (M75) and the back machining block skip end command (EM75) remaining as a result of erasure are different from each other. Therefore, the same tool selection command is searched for after the back machining block skip command (M75). A judgment is made as to whether all blocks between the back machining block skip command (M75) and the searched command are only blocks having no influence on electronic cam data transformation. When all blocks are only commands having no influence, the back machining block skip end command (EM75) is moved to the rear of the searched command.

On the other hand, assume another case than the case of the NC program shown in FIG. 7. That is, a plurality of combinations each having a back machining block skip command (M75) and a back machining block skip end command (EM75) are present in the NC program. Erasable commands in the plurality of combinations are erased. If the tool selection commands in the back machining block skip command (M75) and the back machining block skip end command (EM75) remaining as a result of erasure are equal to each other, the NC program can be transformed into electronic cam data directly.

On the other hand, when all blocks are not blocks having no influence, a command having influence is searched for. A judgment is made as to whether the command having influence can be moved to the rear of the tool selection command without any problem. When there is no problem, the command having influence is moved and the back machining block skip end command (EM75) is moved.

According to the embodiment, the following effect can be obtained.

That is, there is an effect that the number of transformable NC programs increases when NC programs are to be transformed into electronic cam data having a large merit in shortening of machining time. This is because the possibility of increase in the number of NC programs allowed to be transformed into electronic cam data can be increased by reducing the absolute number of "block skip commands" as a barrier to transformation into electronic cam data.

Further, when block skip commands that cannot be erased are present so that the tool selection command in the block skip source and the tool selection command in the block skip destination are not equal to each other, the block skip commands are processed so that the tool selection commands are made equal to each other. Accordingly, the number of NC programs allowed to be transformed into electronic cam data can be increased.

Further, when a command having influence is present when the tool selection commands are made equal to each other, a process of moving the command is also performed. Accordingly, the number of NC programs allowed to be transformed into electronic cam data can be increased.

Because efficiency in transformation of NC programs into electronic cam programs can be improved, working efficiency can be consequently improved.

Incidentally, the invention is not limited to the embodiment.

Various configurations of machines to be controlled may be conceived. The configuration shown in the drawings is taken as an example.

Various commands can be assumed as the block skip commands. The back machining block skip command is taken as an example. It is a matter of course that the invention can be also applied to the case where block skip commands are contained in a main machining program.

As described above in detail, in the numerical control apparatus and method for machine tool according to the invention, a block skip command is first detected by a block skip command detection means and a block skip end command is detected by the block skip end command detection means. Comparison between coordinates in the block skip command and coordinates in the block skip end command is made by a coordinate comparison means to judge whether the coordinates in the block skip command are the same as the coordinates in the block skip end command. Accordingly, at least a judgment can be made as to whether an NC program can be transformed into an electronic cam program.

On this occasion, when configuration is made so that the coordinate comparison means performs comparison between the coordinates on the basis of selected tool numbers, a judgement can be made easily as to whether the coordinates in the block skip command are the same as the coordinates in the block skip end command.

A block skip erasing means may be provided for performing a process of erasing erasable block skip end commands and erasable block skip commands at the time of transformation of the NC program into the electronic cam program when a plurality of block skip command-block skip end command combinations are present in the NC program. In this configuration, the absolute number of "block skip commands" as a barrier to transformation into electronic cam data can be reduced, so that the number of NC programs allowed to be transformed into electronic cam data can be increased to thereby improve efficiency in transformation.

Further, there may be provided: a transformation judgment means for searching for "good" coordinates after the block skip end command when "no good" is decided as a result of comparison by the coordinate comparison means, and performing a judgment, when identical coordinates are detected, as to whether the NC program written in blocks between a block of the detected coordinates and the block skip end command can be transformed into an electronic cam program or not; and a moving means for moving the block skip end command to the rear of a line on which the coordinates are detected when "good" is obtained as a result of the judgment by the transformation judgment means. In this configuration, the number of NC programs allowed to be transformed into electronic cam data can be increased to thereby improve efficiency in transformation.

Further, there may be provided: a transformation judgment means for searching for "good" coordinates after the block skip end command when "no good" is decided as a result of comparison by the coordinate comparison means, and performing a judgment, when identical coordinates are detected, as to whether the NC program written in blocks between a block of the detected coordinates and the block skip end command can be transformed into an electronic cam program or not; a movement judgment means for performing a judgment, when "no good" is given as a result of the judgment by the transformation judgment means, as to whether a command causing "no good" of transformation can be moved to the rear of the block of the detected coordinates without any trouble; and a "no good" causal command moving means for moving the command causing "no good" of transformation to a line on the rear of the block of the detected coordinates when "good" is given as a result of the judgment by the movement judgment means. In this configuration, the number of NC programs allowed to be transformed into electronic cam data can be increased to thereby improve efficiency in transformation.

Further, transformation into the electronic cam program may be executed in the condition that erasable block skip processes are erased to reduce the number of erasable block skip processes. In this configuration, the possibility of transformation into the electronic cam program can be improved.

What is claimed is:

1. A numerical control apparatus for machine tool, comprising:
    an NC program storage portion for storing an NC program generated for machining a material into a desired shape;
    a block skip command detection means for detecting whether a block skip command for skipping execution of blocks after a position where the block skip command is described is present in said NC program stored in said NC program storage portion or not;
    a block skip end command detection means for detecting whether a block skip end command provided in connection with the block skip command to permit execution of blocks after a position where the block skip end command is described is present in said NC program stored in said NC program storage portion or not; and
    a coordinate comparison means for performing comparison concerning a difference between coordinates on at least one control axis in said block skip command and said block skip end command.

2. The numerical control apparatus for machine tool according to claim 1,
    wherein said coordinate comparison means performs comparison concerning a difference between coordinates on the basis of selected tool numbers.

3. The numerical control apparatus for machine tool according to claim 1, further comprising:
    a block skip erasing means for performing a process of erasing erasable block skip end commands and erasable block skip commands at the time of transformation of said NC program into said electronic cam program when a plurality of block skip command-block skip end command combinations are present in said NC program.

4. The numerical control apparatus for machine tool according to claim 1, further comprising:
    a transformation judgment means for searching for "good" coordinates after said block skip end command when "no good" is decided as a result of comparison by said coordinate comparison means, and performing a judgment, when identical coordinates are detected, as to whether said NC program written in blocks between a block of said detected coordinates and said block skip end command can be transformed into an electronic cam program or not; and
    a moving means for moving said block skip end command to the rear of a line on which said coordinates are detected when "good" is obtained as a result of the judgment by said transformation judgment means.

5. The numerical control apparatus for machine tool according to claim 1, further comprising:
    a transformation judgment means for searching for "good" coordinates after said block skip end command when "no good" is decided as a result of comparison by said coordinate comparison means, and performing a judgment, when identical coordinates are detected, as to whether said NC program written in blocks between a block of said detected coordinates and said block skip end command can be transformed into an electronic cam program or not;
    a movement judgment means for performing a judgment, when "no good" is given as a result of the judgment by said transformation judgment means, as to whether a command causing "no good" of transformation can be moved to the rear of the block of the detected coordinates without any trouble; and
    a "no good" causal command moving means for moving said command causing "no good" of transformation to a line on the rear of the block of the detected coordinates when "good" is given as a result of the judgment by said movement judgment means.

6. A numerical control apparatus for machine tool, comprising:
    an NC program storage portion for storing an NC program generated for machining a material into a desired shape;
    a block skip command detection means for detecting whether a block skip command for skipping execution of blocks after a position where the block skip command is described is present in said NC program stored in said NC program storage portion or not;
    a block skip end command detection means for detecting whether a block skip end command provided in connection with the block skip command to permit execution of blocks after a position where the block skip end command is described is present in said NC program stored in said NC program storage portion or not;
    a block skip erasure judgment means for judging whether both the block skip command and the block skip end command detected by said block skip command detection means and said block skip end command detection means respectively can be erased or not;
    a block skip erasure means for erasing said block skip command and said block skip end command when said block skip erasure judgment means makes a decision that these commands can be detected; and
    a program transformation means for transforming said NC program into an electronic cam program.

7. A numerical control method for machine tool, comprising the steps of:
(a) reading an NC program;
(b) applying a predetermined block skip pre-process to said NC program read by the step (a); and
(c) transforming said NC program subjected to said predetermined block skip pre-process by the step (b) into electronic cam data.

8. The numerical control method for machine tool according to claim 7, wherein the step (b) includes the steps of:
(b-1) performing a block skip erasure process for erasing erasable block skip destinations and erasable block skip sources; and
(b-2) applying a block skip destination changing process to at least one block skip remaining after erasure by the step (b-1).

9. The numerical control method for machine tool according to claim 8, wherein the step (b-1) includes the steps of:
(b-1-1) performing a judgment, when there are a plurality of block skip processes, as to whether all commands between a block skip destination and a next block skip source are only commands having no influence on electronic cam data transformation; and
(b-1-2) erasing said block skip destination and said next block skip source when the judgment in the step (b-1-1) makes a decision that there are only commands having no influence on electronic cam data transformation.

10. The numerical control method for machine tool according to claim 8, wherein the step (b-2) includes the steps of:
(b-2-1) comparing coordinates of the block skip source with coordinates of the block skip destination to thereby judge whether the coordinates of the block skip source are the same as the coordinates of the block skip destination or not;
(b-2-2) searching for a coordinate command identical to the coordinates of the block skip source after the judgment when the judgment of the step (b-2-1) makes a decision that the coordinates of the block skip source are different from the coordinates of the block skip destination;
(b-2-3) judging whether all commands between the new coordinate command searched for by the step (b-2-2) and the coordinates of the block skip destination are only commands having no influence on electronic cam data transformation; and
(b-2-4) moving the block skip destination command to the rear of the new coordinate command when the judgment in the step (b-2-3) makes a decision that there are only commands having no influence on electronic cam data transformation.

11. The numerical control method for machine tool according to claim 10, further comprising the steps of:
(d) performing a judgment, when there is a decision that all commands between the new coordinate command and the coordinates of the block skip destination are not only commands having no influence on electronic cam data transformation, as to whether a command having influence on electronic cam data transformation can be moved to the rear of the new coordinate command or not;
(e) moving the command having influence on electronic cam data transformation to the rear of the new coordinate command when the judgment in the step (d) makes a decision that the command having influence on electronic cam data transformation can be moved without any trouble; and
(f) further moving the block skip destination command to the rear of the new coordinate command.

12. The numerical control method for machine tool according to claim 10, wherein the judgment as to whether the coordinates are the same or not is based on selected tool numbers.

* * * * *